UNITED STATES PATENT OFFICE 2,683,714

4-TERTIARY AMINO-1-ALKYL-PIPERIDINES AND PROCESS OF PRODUCING THEM

Rolf Kallischnigg, Ludwigshafen (Rhine), Germany, assignor to Knoll A. G., Ludwigshafen (Rhine), Germany, a German firm No Drawing. Application March 25, 1950, Serial No. 152,010

Claims priority, application Germany July 20, 1949

16 Claims. (Cl. 260—293)

The present invention relates to new therapeutically valuable compounds. More specifically it relates to compounds of the following structural formula

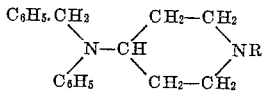

In the above formula R represents a low molecular alkyl radical.

Other objects of the present invention are the provision of derivatives of the above indicated 4 - (N - phenyl - N - benzyl) - amino - 1 - alykl-piperidines the said derivatives containing as substituents in the aromatic ring systems of the molecule other atoms and groups such as halogen atoms, low molecular alkyl radicals, and low molecular alkoxy groups.

It has been found, that the new compounds have, in combination with a very strong spasmolytic action upon the muscular system of unstriped muscles, an antihistamine action equal to the antihistamine action of the best known preparations of this group of remedies.

The new compound 4-(N-phenyl-N-benzyl)-amino-1-methyl-piperidine particularly has been found to have also a high anticholine action in addition to the above stated actions.

As one more advantage of this compound its lack of toxicity in animal as well as in human therapeutics must be mentioned and its compatibility is by far better than that of other known compounds having antihistamine action. In consequence thereof no secondary effects at all are evident, if the compound is applied in therapeutic doses.

Another object of the invention is a process for producing the new compounds. The process consists in condensing 1-alkyl-piperidone-4 with aniline and aniline substituted in the nucleus respectively. Compounds of the type of Schiff's bases are obtained which are transformed by way of reduction into a secondary amine. The reduction can be performed either by means of hydrogen and catalysts or by means of chemical reducing agents, such as aluminium and amalgamated aluminium respectively.

The hydrogen atom linked to the nitrogen atom of the secondary amine is then replaced by a metallic residue of the group consisting of Na, K, Li, and Mg-halogen. The metal compound thus obtained is reacted with benzyl chloride or one of the derivatives of benzyl chloride substituted in the nucleus and forms a tertiary amine. For the preparation of the metal compounds the metals themselves can be used in the metallic state, e. g. in the form of finely divided powders. They can also be used in the form of an amide, such as sodium amide, for instance. The residue Mg-halogen is used in the form of a Grignard compound.

In order to illustrate the present invention the following examples are inserted without any intention of limiting the invention thereto.

(1) *Anil of 1-methyl-piperidone-4.*—80 g. of 1-methyl-piperidone-4 and 70 g. of aniline are boiled, using a water separator in 350 cc. of toluene to which several drops of glacial acetic acid have been added, until the theoretical quantity of water (12.7 cc.) has separated out. The toluene is then distilled off and the remains are fractionated at reduced pressure. At a boiling point of 156° C., at 13 mm. of Hg pressure, 118 g. of a weakly yellow colored oil are obtained.

*4-N-phenyl-amino-1-methyl-piperidine.* — 100 g. of the above described anil of 1-methyl-piperidone-4 are boiled for 8 hours, using a reflux condenser, with 30 g. of activated borings of aluminium in 300 cc. of methanol diluted with 60 cc. of water. The liquid phase is then separated from the solid phase, the solvent is evaporated and the residuum is fractionated at reduced pressure, 95 g. of a colorless oil being obtained boiling at 163–165° C. at 15 mm. of Hg. pressure. The oil solidifies at once to a mass of crystals. After having been recrystallized from dibutyl ether the base melts at 87° C., its dihydrochloride has the melting point of 246° C.

*4 - (N - phenyl - N - benzyl) - amino-1-methyl-piperidine.*—95 g. of 4-N-phenyl-amino-1-methyl-piperidine are boiled together with 22 g. of pulverized sodium amide in 300 cc. of benzene, using a reflux condenser, while nitrogen is passed thru the reaction mixture, until the evolution of ammonia has ceased. 64 g. of benzyl chloride are then gradually added drop by drop to the boiling reaction product and boiling is continued for several hours. After having been cooled the solution is shaken with water and subsequently dried with potassium carbonate. The solvent having been evaporated the remaining base solidifies with the formation of crystals, the yield amounting to 123 g. The base is recrystallized from dibutyl ether and has a melting point of 115° C.; its dihydrochloride melts at 189° C.

(2) *4 - (N - 4' - methoxyphenyl) - amino - 1 - methyl-piperidine.*—56 g. of 1-methyl-piperidone-4 and 67 g. of p-anisidine are boiled, with a water separator, in 250 cc. of toluene to which several drops of glacial acetic acid have been added, until about 9 cc. of water have separated out. The solvent having been evaporated, the reaction mixture is mixed with 250 cc. of methanol, 30 cc. of water and 15 g. of activated borings of aluminium and the mixture is boiled for 8 hours with reflux condenser. The liquid phase is then separated from the solid phase and subsequently fractionated at a reduced pressure. 85 g. of a base are obtained boiling at 172–173° C. at 8 mm. of Hg pressure. After having been recrystallized from petroleum ether the base melts at 46.5° C.; its dihydrochloride has a melting point of 248° C.

*4 - (N - 4' - methoxyphenyl - N - benzyl) - amino-1-methyl-piperidine.*—55 g. of 4-(N-4'-methoxyphenyl) - amino - 1 - methyl - piperidine are boiled together with 14 g. of pulverized sodium amide in 100 cc. of benzene with a reflux condenser while nitrogen is passed thru the reaction mixture, until the evolution of ammonia has ceased. 42 g. of benzylchloride are then added to the reaction mixture the heating being continued for several more hours. After having been cooled the solution is shaken with water and dried with potassium carbonate. The solvent is evaporated and 78 g. of a residue are obtained representing the desired base which melts at 83° C. after recrystallization from petroleum ether. The dihydrochloride of the base has a melting point of 194° C.

After having fully described and explained my present invention, what I claim is:

1. As new products, the compounds selected from the group consisting of the organic bases and acid salts thereof with non toxic anions corresponding with the general structural formula

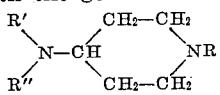

in which R is a low molecular alkyl radical, R' stands for benzyl and R'' stands for a member of the group consisting of phenyl and phenyl substituted by a member selected from the group consisting of halogen, low molecular alkyl radicals and low molecular alkoxy groups.

2. As new products, the compounds corresponding with the general structural formula

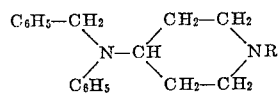

in which R stands for a low molecular alkyl radical.

3. As a new product, the compound 4-(N-phenyl-N-benzyl)-amino-1 - methyl - piperidine having a melting point of about 115° C.

4. As a new product, the dihydrochloride of 4-(N - phenyl - N - benzyl) - amino - 1 - methyl-piperidine having a melting point of about 189° C.

5. As a new product, the compound 4-(N-p-methoxy - phenyl - N - benzyl) - amino - 1-methylpiperidine having a melting point of about 83° C.

6. As a new product, the dihydrochloride of 4 - (N - p - methoxyphenyl - N - benzyl) - amino-1-methylpiperidine having a melting point of about 194° C.

7. The process which comprises the steps of condensing 1-alkyl-piperidone-4 with a member selected from the group consisting of aniline and aniline substituted by a member of the group consisting of halogen, low molecular alkyl radicals and low molecular alkoxy groups, reducing the resulting anil to the corresponding secondary amine, replacing the hydrogen atom linked to the nitrogen atom of the secondary amine by a metallic residue of the group consisting of Na, K, Li and Mg-halogen, and causing the metal compound formed to react with a benzylchloride.

8. The process which comprises the steps of condensing 1-alkyl-piperidone-4 with aniline, reducing the resulting anil to the corresponding secondary amine, replacing the hydrogen atom linked to the nitrogen atom of the secondary amine by sodium, and causing the metal compound formed to react with benzyl chloride.

9. The process which comprises the steps of condensing 1-alkyl-piperidone-4 with aniline substituted by halogen, reducing the resulting anil to the corresponding secondary amine, replacing the hydrogen atom linked to the nitrogen atom of the secondary amine by sodium, and causing the metal compound formed to react with benzylchloride.

10. The process which comprises the steps of condensing 1-alkyl-piperidone-4 with aniline substituted by low molecular alkyl radicals, reducing the resulting anil to the corresponding secondary amine, replacing the hydrogen atom linked to the nitrogen atom of the secondary amine by sodium, and causing the metal compound formed to react with benzylchloride.

11. The process which comprises the steps of condensing 1-alkyl-piperidone-4 with aniline substituted by low molecular alkoxy groups, reducing the resulting anil to the corresponding secondary amine, replacing the hydrogen atom linked to the nitrogen atom of the secondary amine by sodium, and causing the metal compound formed to react with benzylchloride.

12. The process which comprises the steps of condensing 1-methyl-piperidone-4 with aniline, reducing the resulting anil to the corresponding secondary amine, replacing the hydrogen atom linked to the nitrogen atom of the secondary amine by sodium, and causing the metal compound formed to react with benzylchloride.

13. The process which comprises the steps of condensing 1-methyl-piperidone-4 with aniline substituted by halogen, reducing the resulting anil to the corresponding secondary amine, replacing the hydrogen atom linked to the nitrogen atom of the secondary amine by sodium, and causing the metal compound formed to react with benzylchloride.

14. The process which comprises the steps of condensing 1-methyl-piperidone-4 with aniline substituted by low molecular alkyl groups, reducing the resulting anil to the corresponding secondary amine, replacing the hydrogen atom linked to the nitrogen atom of the secondary amine by sodium, and causing the metal compound formed to react with benzylchloride.

15. The process which comprises the steps of condensing 1-methyl-piperidone-4 with aniline substituted by low molecular alkoxy groups, reducing the resulting anil to the corresponding secondary amine, replacing the hydrogen atom linked to the nitrogen atom of the secondary amine sodium, and causing the metal compound formed to react with benzylchloride.

16. The process which comprises the steps of condensing 1-methyl-piperidone-4 with aniline, reducing the resulting anil to the corresponding secondary amine 4 - N - phenylamino - 1-methyl-piperidine and causing the secondary amine to react with benzylchloride in the presence of sodium amide.

No references cited.